United States Patent
Tsukano (10) Patent No.: US 9,854,135 B2
(45) Date of Patent: Dec. 26, 2017

(54) INFORMATION PROCESSING APPARATUS AND RECORDING MEDIUM

(71) Applicant: KONICA MINOLTA, INC., Chiyoda-ku, Tokyo (JP)

(72) Inventor: Toshiki Tsukano, Hachioji (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/161,353

(22) Filed: May 23, 2016

(65) Prior Publication Data
US 2016/0366306 A1 Dec. 15, 2016

(30) Foreign Application Priority Data
Jun. 11, 2015 (JP) ................ 2015-118332

(51) Int. Cl.
*G06F 15/00* (2006.01)
*G06K 1/00* (2006.01)
*H04N 1/60* (2006.01)
*H04N 1/00* (2006.01)
*G06K 15/02* (2006.01)
*G06F 3/12* (2006.01)

(52) U.S. Cl.
CPC ......... *H04N 1/6027* (2013.01); *G06F 3/1259* (2013.01); *G06F 3/1273* (2013.01); *G06F 3/1291* (2013.01); *G06K 15/1878* (2013.01); *H04N 1/00082* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 2010/0302597 A1* | 12/2010 | Sugiyama | .......... | G06K 15/1803 358/3.27 |
| 2012/0218594 A1* | 8/2012 | Komine | ................ | G06F 3/1211 358/1.15 |
| 2013/0050722 A1* | 2/2013 | Kujirai | ..................... | H04N 1/46 358/1.9 |
| 2013/0164011 A1* | 6/2013 | Nakamura | ......... | G03G 15/1675 399/66 |
| 2014/0139883 A1* | 5/2014 | Hashizume | ........ | H04N 1/00015 358/3.06 |

FOREIGN PATENT DOCUMENTS

JP 2003-208286 A 7/2003

* cited by examiner

*Primary Examiner* — Helen Q Zong
(74) *Attorney, Agent, or Firm* — Buchanan Ingersoll & Rooney PC

(57) ABSTRACT

An information processing apparatus of the present invention determines whether or not there is a bias in jobs distributed to a plurality of printers to be used in a distributed printing system. In addition, in a case where there is a bias in distributed jobs, the information processing apparatus decides a color correction target to be applied to a printer having a small number of distributed jobs and resulting in an unused state, applies the decided color correction target to the printer having a small number of jobs, to thereby decide a timing of performing color adjustment on the printer having a small number of jobs. The printer having a small number of jobs and resulting in an unused state is subjected to color adjustment at the decided timing.

8 Claims, 10 Drawing Sheets

RESERVED JOB MANAGEMENT PORTION

| JOB NAME | SCHEDULED OUTPUT DESTINATION | COLOR CORRECTION TARGET | SCHEDULED OUTPUT DATE AND TIME |
|---|---|---|---|
| Job1 | PRINTER A | JapanColor | 2015/4/1 10:00 |
| Job2 | PRINTER A | JapanColor | 2015/4/11 10:30 |
| Job3 | PRINTER B | GRACoL | 2015/4/10 9:00 |
| ⋮ | | | |
| Job99 | PRINTER C | Custom | 2015/4/16 8:00 |
| Job100 | PRINTER A | JapanColor | 2015/4/16 9:00 |

FIG. 4

| SCHEDULED OUTPUT DESTINATION | COLOR CORRECTION TARGET | NUMBER OF JOBS |
|---|---|---|
| PRINTER A | JapanColor | 60 |
| PRINTER B | GRACoL | 39 |
| PRINTER C | Custom | 1 |

INFORMATION PROCESSING APPARATUS AND RECORDING MEDIUM

BACKGROUND OF THE INVENTION

Field of the Invention:

The present invention relates to an information processing apparatus and a recording medium, and particularly to an information processing apparatus that outputs jobs to a plurality of image forming apparatuses in a distributed manner, and a computer-readable recording medium storing an information processing program to be used in the information processing apparatus.

Description of the Related Art:

There is realized customer-required color reproduction at a printing site by performing and operating color adjustment in accordance with a color correction target which has been set for each image forming apparatus. In addition, a printing site having introduced a plurality of image forming apparatuses aims to improve productivity by outputting jobs in a distributed manner to image forming apparatuses having color adjusted in accordance with the customer requirement.

When outputting jobs to a plurality of image forming apparatuses in a distributed manner, an image output of excellent image quality is realized by selecting an image forming apparatus to be used for printing in accordance with the customer-required image quality (see Japanese Laid-Open Patent Publication No. 2003-208286, for example).

SUMMARY OF THE INVENTION

However, with the above-described technique, an image forming apparatus is simply selected according to the customer-required image quality when distributing jobs to a plurality of image forming apparatuses and thus there is a concern that jobs may concentrate on a particular image forming apparatus, i.e., the so-called bias in numbers of jobs may be generated. In addition, depending on the situation of jobs, there may be generated a case where an image forming apparatus is not used due to bias in numbers of jobs, with the result that degradation in productivity may be caused. The foregoing is due to the color correction target (target color, acceptable width) being fixed for each image forming apparatus.

The present invention has been made in view of the above situation, and an object of the present invention is to provide an information processing apparatus that dynamically changes the color correction target for each image forming apparatus to thereby enhance productivity of image forming processing, and a computer-readable recording medium storing an information processing program to be used by the information processing apparatus.

In order to achieve at least one of the above-described objects, an information processing apparatus reflecting an aspect of the present invention includes:

a bias determination portion configured to determine whether or not there is a bias in numbers of output-reserved jobs to be distributed to a plurality of image forming apparatuses;

a color correction target decision portion configured to decide a color correction target to be applied to an image forming apparatus having a small number of jobs, in a case where the bias determination portion has determined that there is a bias in numbers of jobs; and a color adjustment timing decision portion configured to apply the color correction target decided by the color correction target decision portion to the image forming apparatus having a small number of jobs, to thereby decide a timing of performing color adjustment on the image forming apparatus having a small number of jobs.

It is desirable that each of the image forming apparatuses includes an automatic color adjustment execution portion configured to automatically perform color adjustment at a periodic timing, and the color adjustment timing decision portion applies a color correction target to an image forming apparatus having a small number of jobs to thereby decide the timing of performing color adjustment, on the basis of reserved job information, a scheduled output time of a reserved job, and a periodic color adjustment timing by the automatic color adjustment execution portion.

It is desirable that, in the information processing apparatus, the color adjustment timing decision portion decides the timing of applying the color correction target to the image forming apparatus having a small number of jobs and of performing color adjustment, to be the periodic color adjustment timing.

It is desirable that, in the information processing apparatus, the color adjustment timing decision portion decides the timing of applying the color correction target to the image forming apparatus having a small number of jobs and of performing color adjustment, to be a timing other than the periodic color adjustment timing, in a case where an unused period of an image forming apparatus obtained from the decided color adjustment timing and the reserved job information reaches a predetermined time or longer.

It is desirable that the above-described information processing apparatus further includes:

a history management portion configured to manage job output history of the past in a case where there is no output-reserved job;

a history job classification portion that classifies output jobs for each color correction target, from a history for a certain period being managed by the history management portion;

a color correction target use frequency determination portion configured to determine a use frequency of a color correction target, in accordance with the number of jobs classified by the history job classification portion, and a color correction target selection portion configured to select a color correction target that is highly likely to be used thereafter, from determination by the color correction target use frequency determination portion.

It is desirable that the information processing apparatus preliminarily configures the plurality of image forming apparatuses as a group of image forming apparatuses to thereby be managed, and distributes jobs to the plurality of image forming apparatuses.

Here, "color correction target" basically refers to a printing color standard such as, for example, Japanese standard "Japan Color" or the U.S. standard "GRACoL (registered trademark)". However, "color correction target" is not limited to color standards and is assumed to include color settings or the like uniquely set by the customer on the basis of such color standards. In addition, in the present specification, color settings uniquely set by the customer are referred to as "Custom". Namely, "color correction target" in the present specification refers to color settings (color conversion settings) such as "Japan Color", "GRACoL (registered trademark)", "Custom", or the like.

DESCRIPTION OF THE PREFERRED EMBODIMENTS

Hereinafter, a form of implementing the present invention (hereinafter, referred to as "embodiment") will be described in detail using the drawings. The present invention is not limited to the embodiments. Note that, in the following description and respective drawings, the same reference numerals are used for the same elements or elements having the same function, and duplicate explanation thereof is omitted.

First Embodiment

Figure 1:
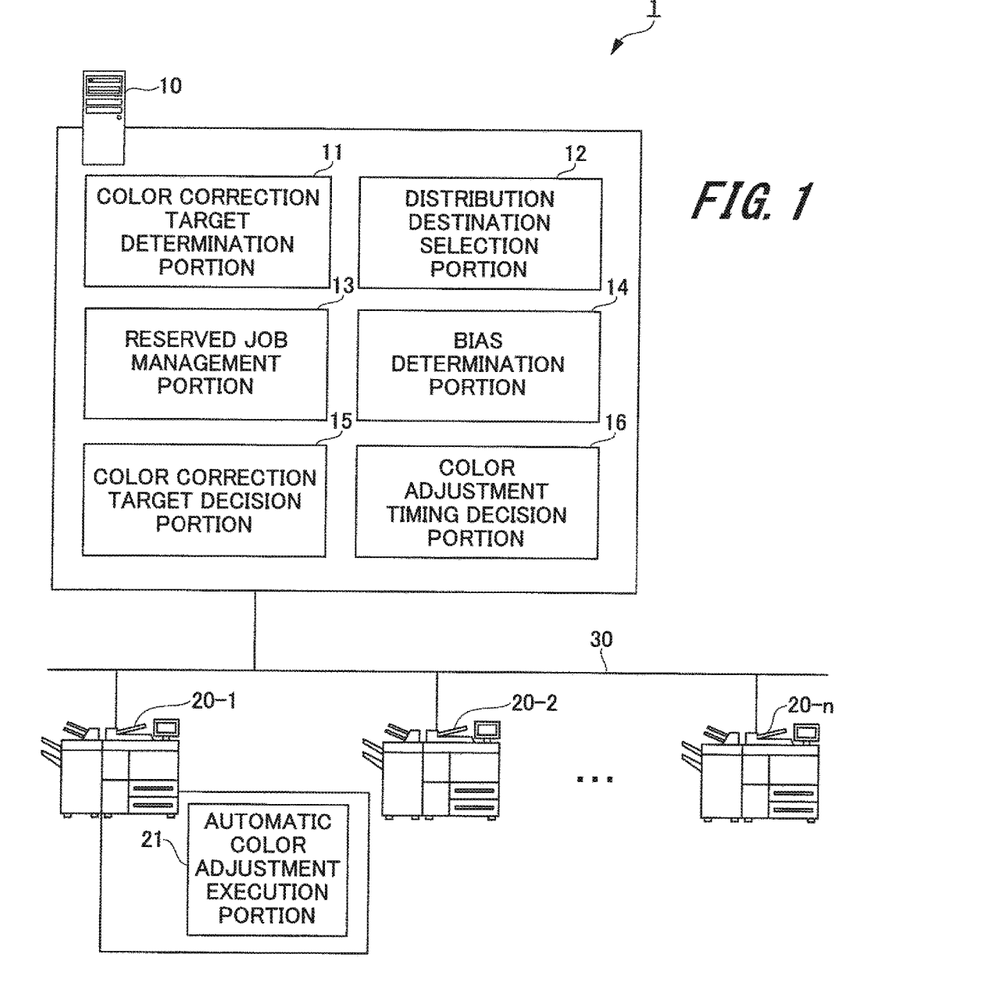
FIG. 1 is a system configuration diagram illustrating an exemplary configuration of a distributed printing system having an information processing apparatus according to a first embodiment of the present invention.

FIG. 1 is a system configuration diagram illustrating an exemplary configuration of a distributed printing system having an information processing apparatus according to a first embodiment of the present invention.

[System Configuration]

As illustrated in FIG. 1, the present distributed printing system 1 has a job distribution server 10 and a plurality of image forming apparatuses such as n printers 20_1, 20_2, . . . , 20_n, which are mutually communicably connected via a network 30. In the distributed printing system 1, the job distribution server 10 is the information processing apparatus according to the first embodiment of the present invention. In the distributed printing system 1, the job distribution server 10 preliminarily sets n printers 20_1, 20_2, . . . , 20_n as a group of printers to thereby be managed. Specifically, the job distribution server 10 performs distributed processing of jobs on the printers 20_1, 20_2, . . . , 20_n subjected to color adjustment in accordance with different color correction targets. "Job distribution" is not limited to distribution in terms of jobs, and can also refer to distribution in terms of pages. Namely, "job distribution" in the present specification includes distribution in terms of pages.

(Job Distribution Server)

In FIG. 1, the job distribution server 10 is a server that accumulates jobs requested to be output, and distributes jobs to appropriate printers among the printers 20_1, 20_2, . . . , 20_n subjected to color adjustment in accordance with different color correction targets. The job distribution server 10 includes respective functional portions such as a color correction target determination portion 11 for each job, a distribution destination selection portion 12, a reserved job management portion 13, a bias determination portion 14, a color correction target decision portion 15, and a color adjustment timing decision portion 16.

In the job distribution server 10 having the above-described configuration, the color correction target determination portion 11 is software that determines, from information of an output-reserved job, the color correction target of the job. The distribution destination selection portion 12 is software that decides the output destination of a job (i.e., printer to which jobs are distributed), from the color correction targets of the printers 20_1, 20_2, . . . , 20_n being managed by the job distribution server 10 via the network 30, and the color correction target of a job determined by the color correction target determination portion 11.

The reserved job management portion 13 is software that manages, as reserved job information, the color correction target determined by the color correction target determination portion 11, and information such as the output destination printer decided by the distribution destination selection portion 12 and the scheduled output time of the job. The bias determination portion 14 is software that determines whether or not there is a bias in the numbers of jobs among the distribution destination printers, from a list of reserved job information accumulated in the reserved job management portion 13.

The color correction target decision portion 15 is software that decides a color correction target to be applied to a printer having a small number of distributed jobs and resulting in an unused state, in a case where the bias determination portion 14 has determined that there is a bias in the numbers of distributed jobs (numbers of jobs). The color adjustment timing decision portion 16 is software that decides the timing of changing the color correction target and of performing color adjustment in a printer resulting in an unused state, on the basis of a periodic execution timing of automatic color adjustment periodically performed by the printer having a small number of jobs and resulting in an unused state, and the scheduled output time of the job.

(Printer)

The n printers 20_1, 20_2, . . . , 20_n output (print) the jobs distributed by the job distribution server 10. The printers 20_1, 20_2, . . . , 20_n includes the functional portion of an automatic color adjustment execution portion 21. The automatic color adjustment execution portion 21 performs color adjustment periodically and automatically in accordance with the prescribed color correction target. In addition, the automatic color adjustment execution portion 21 includes a colorimeter provided therein, and is hardware and software that automatically execute chart printing, colorimetry, and feedback to thereby perform color adjustment.

[Flow of Distributed Printing]

Subsequently, in the distributed printing system 1 having the above-described configuration, an exemplary flow of a distributed printing processing executed under control by a computer included by the distributed printing system 1 will be described using the flowchart of FIG. 2. Hereinafter, three printers A, B and C will be described for the n printers 20_1, 20_2, . . . , 20_n, for ease of understanding.

In the job distribution server 10, the color correction target determination portion 11 acquires information of a reserved job, and determines a color correction target to be output, on the basis of the acquired reserved job information (step S11). Profile information, shipping destination information, product information, customer information, special ink or the like, of a reserved job can be exemplified as the reserved job information. Next, the distribution destination selection portion 12 receives the result of determination by the color correction target determination portion 11, namely, the color correction target determined by the color correction target determination portion 11, and selects a printer subjected to color adjustment in accordance with the color correction target, from among the printers A, B and C connected to the job distribution server 10 via the network 30 (step S12).

Next, the reserved job management portion 13 registers the information acquired in the processing of step S11 and step S12 as reserved job information. An exemplary data structure of the reserved job management portion 13 is illustrated in FIG. 3. In the case of the example of FIG. 3, respective pieces of information such as job name, scheduled output destination (distribution destination), color correction target, and scheduled output date and time are managed in the reserved job management portion 13, as reserved job information. The scheduled output date and time is information to be input by the customer.

Figure 3:
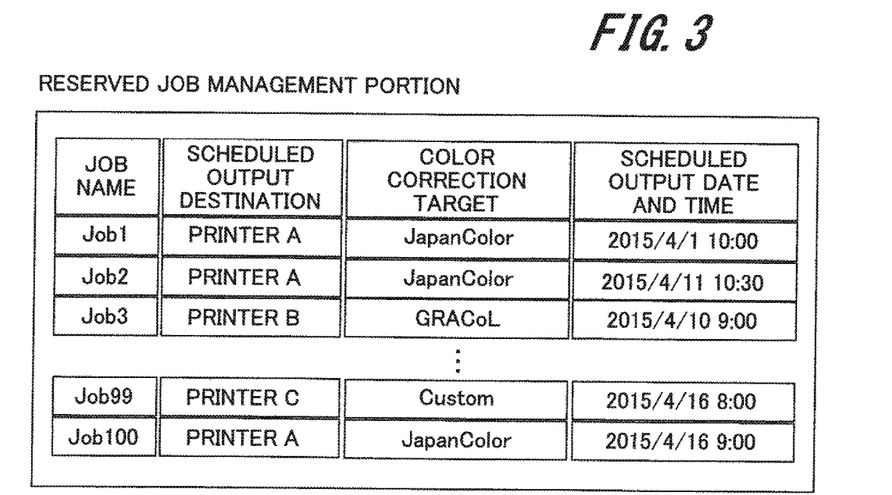
FIG. 3 illustrates an exemplary data structure of a reserved job management portion.
Figure 4:
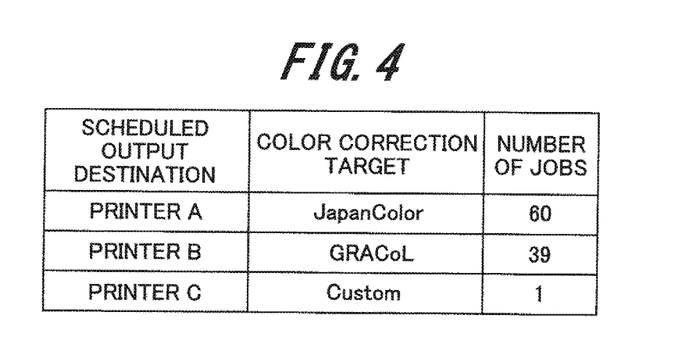
FIG. 4 illustrates an exemplary state of the reserved job of FIG. 3.

Next, the bias determination portion 14 grasps which job is to be distributed to which printer for each color correction target, on the basis of management information of the reserved job management portion 13, and determines whether or not there is a bias in the numbers of jobs among the distribution destination printers (step S14). FIG. 4 illustrates an exemplary state of the reserved job of FIG. 3. In the case of the example of FIG. 4, the number of jobs for the printer A having a color correction target "Japan Color" is "60", the number of jobs for the printer B with a color correction target "GRACoL (registered trademark)" is "39", and the number of jobs for the printer C having a color correction target "Custom" is "1".

Next, when the bias determination portion 14 has determined that there is a bias (YES at S14) in the numbers of distributed jobs (numbers of jobs), the color correction target decision portion 15 decides a frequently-used color correction target and an infrequently-used color correction target, from the data aggregated as illustrated in FIG. 4 (step S15). In the case of the example of FIG. 4, "Japan Color" is the most frequently-used color correction target, and "Custom" is the least frequently-used color correction target.

Subsequently, the color correction target decision portion 15 identifies a printer having a small number of distributed jobs and resulting in an unused state, from the basis of the data aggregated as illustrated in FIG. 4 (step S16). The number of the printers to be identified at this time may be singular or plural. In the case of the example of FIG. 4, the printer C is a printer having a small number of distributed jobs and resulting in an unused state.

Next, the color adjustment timing decision portion 16 acquires a periodic execution timing of automatic color adjustment periodically performed in the printer identified by the color correction target decision portion 15, namely, the printer C in the present example (step S17). Subsequently, the color adjustment timing decision portion 16 decides the timing of changing the color correction target on the basis of the acquired periodic execution timing of automatic color adjustment (step S18).

In the printer C, the automatic color adjustment execution portion 21 repeats periodic execution of automatic color adjustment at a periodic execution timing, changes the color correction target at the periodic execution timing decided by the color adjustment timing decision portion 16, and automatically executes color adjustment (step S19). Note that, when it is determined at step S14 that there is no bias (NO at S14) in the numbers of distributed jobs (numbers of jobs), the processing from step S15 to step S19 is not executed.

[Information Processing Program]

The above-described various processing in the job distribution server 10 is executed by program instructions issued to the computer included by the job distribution server 10. The information processing program which causes the computer to perform the various processing in the job distribution server 10 may be preliminarily installed in a memory included by the job distribution server 10. However, without being limited to the foregoing, the information processing program can also be provided via wired or wireless communication means, or can also be provided by storing a computer-readable recording medium such as an IC card or a USB memory.

Although the color correction target decision portion 15 described above is constituted to have a function of identifying a printer having a small number of distributed jobs and resulting in an unused state in a case where there is a bias in the numbers of distributed jobs (numbers of jobs), the color correction target decision portion 15 may also be constituted to have the following function. Namely, the color correction target decision portion 15 identifies a color correction target having a bias in the numbers of jobs and a printer having a small number of distributed jobs, and determines whether or not the color correction target is an outputable color gamut of the identified printer. In addition, in a case where the color correction target is not an outputable color gamut, the determination is repeated for a printer having the next small number of distributed jobs, or in a case where the color correction target is an outputable color gamut, the color correction target of printer having the next small number is decided to the color correction target to be applied to a printer having a small number of distributed jobs.

The processing performed by the distributed printing system 1 according to the first embodiment described above can be summarized as follows. Namely, the bias determination portion 14 determines whether or not there is a bias in job distribution among a plurality of printers A, B and C, and in a case where the bias determination portion 14 has determined that there is a bias in job distribution, the color correction target decision portion 15 decides a color correction target to be applied to the printer C having a small number of distributed jobs and resulting in an unused state. Then, the color adjustment timing decision portion 16 decides the timing of applying the decided color correction target and of performing color adjustment (color correction), and the automatic color adjustment execution portion 21 performs color adjustment in the printer C, at the decided timing.

Accordingly, a part of the 60 jobs which have been scheduled to be output to the printer A associated with the most frequently used color correction target "Japan Color" can be distributed to the printer C, and the jobs which have been scheduled to be output to the printer C also become outputable. As described above, by dynamically changing the color correction target for each printer, it is possible to effectively utilize the time during which a printer is unused depending on the job status because color correction targets are conventionally fixed to respective printers, and thus enhancement of productivity can be achieved.

[Timing of Changing Color Correction Target]

Subsequently, specific processing of deciding the timing of changing the color correction target (color adjustment timing) will be explained. Hereinafter, a case where a color adjustment timing is generated at a periodic execution timing of automatic color adjustment will be explained as an Example 1, and a case where a color adjustment timing is irregularly generated without being limited to the periodic execution timing of automatic color adjustment will be described as an Example 2.

Example 1

Figure 5:
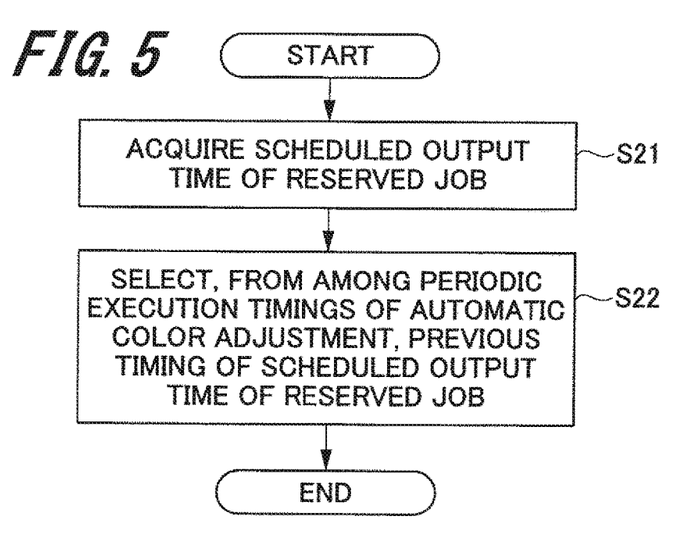
FIG. 5 is a flowchart illustrating exemplary processing of an Example 1 in which a color adjustment timing is generated at a periodic execution timing of automatic color adjustment.

Exemplary processing of the Example 1 in which a color adjustment timing is generated at a periodic execution timing of automatic color adjustment will be described using the flowchart of FIG. 5. Note that the processing of deciding the timing of changing the color correction target turns out to be the specific processing at step S18 of FIG. 2 performed by the color adjustment timing decision portion 16.

The color adjustment timing decision portion 16 acquires, from the data structure of FIG. 3, a scheduled output time (scheduled output date and time) of a job scheduled to be output to the printer C whose color correction target is subject to change (step S21). Subsequently, the color adjustment timing decision portion 16 compares the periodic execution timing of automatic color adjustment acquired at step S17 of FIG. 2 with the scheduled output time of the reserved job acquired at step S21, and decides the periodic execution timing which is in time for the scheduled output time as the timing of changing the color correction target of the printer C (step S22). Specifically, the color adjustment timing decision portion 16 selects, from among the periodic execution timings of automatic color adjustment, a previous periodic execution timing of the scheduled output time of the reserved job, as the timing of changing the color correction target.

Figure 6:
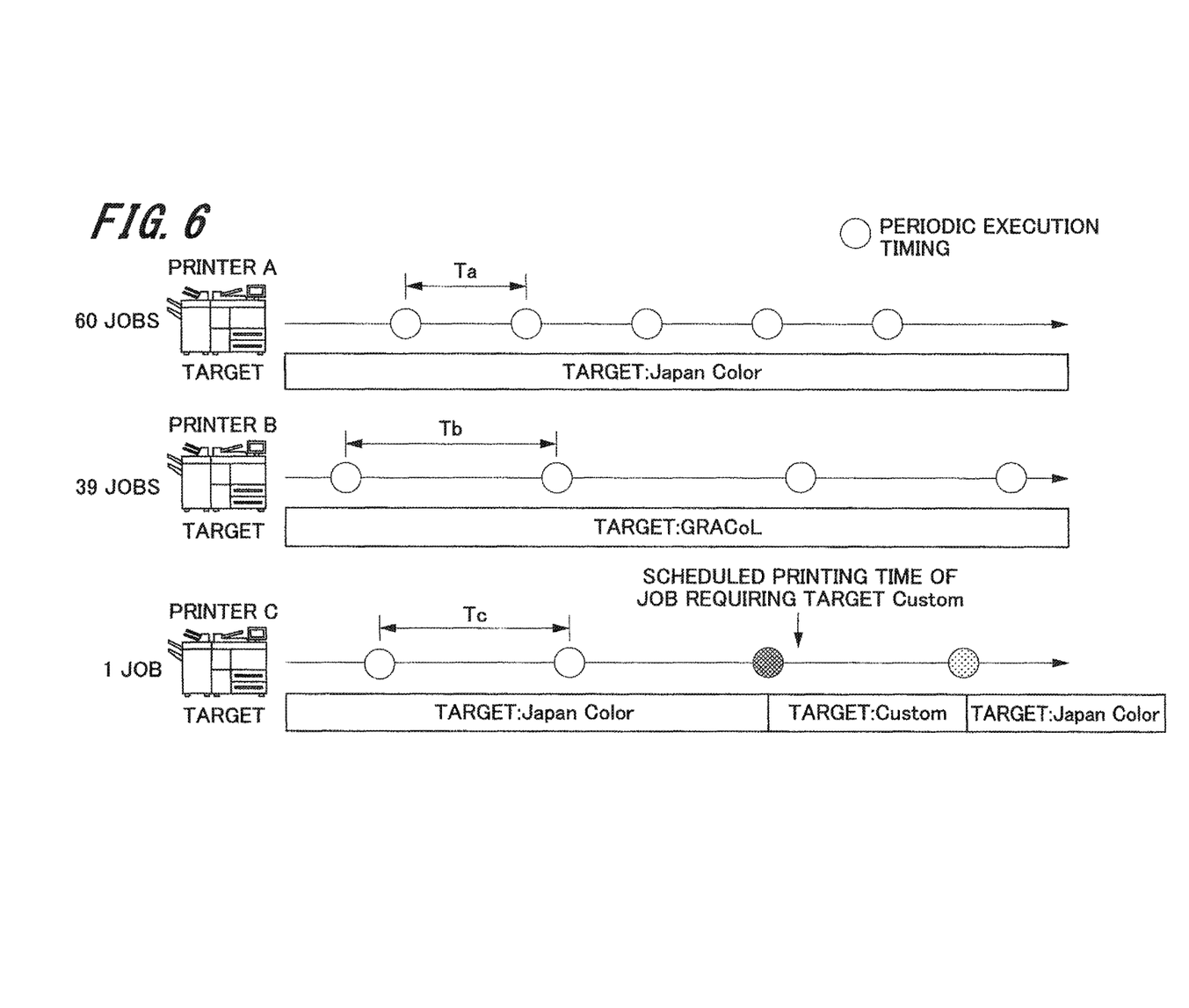
FIG. 6 is a timing chart illustrating a time series image for the case of the Example 1.

A time series image with regard to the determination of timing of changing the color correction target is illustrated in FIG. 6. In the case of the example of FIG. 6, automatic color adjustment is periodically performed at a period of Ta in the printer A whose number of jobs is 60. Automatic color adjustment is periodically performed at a period of Tb in the printer B whose number of jobs is 39. Automatic color adjustment is periodically performed at a period of Tc in the printer C whose number of jobs is 1 and which is identified as a printer having a small number of jobs and resulting in an unused state. In addition, a previous periodic execution timing of automatic color adjustment of the scheduled output time (scheduled printing time) of the reserved job is selected as the timing of changing the color correction target in the printer C.

In the case of the example of FIG. 3, the scheduled output time of a reserved job of the printer C is "2015/4/16 8:00", and thus a previous periodic execution timing of automatic color adjustment is the timing of changing to the color correction target "Custom". Accordingly, the color correction target is changed to "Custom" at the periodic execution timing of previous automatic color adjustment of the scheduled output time of the reserved job (the timing indicated by a circle hatched with a halftone pattern in the drawing) in the printer C which has been outputting jobs according to the most frequently-used color correction target "Japan Color". Then, the color correction target is returned to "Japan Color" at the next periodic execution timing of automatic color adjustment (the timing indicated by a circle hatched with a circle dot pattern in the drawing).

According to the Example 1, the color correction target for each printer can be dynamically changed at a predetermined periodic execution timing, depending on the balance between the scheduled output time of a reserved job and the periodic execution timing of automatically performing color adjustment. In addition, it is possible to automatically and appropriately change the color correction target which has been conventionally set by the customer's manual operation, and thus possible to contribute to enhancing productivity.

Example 2

Figure 7:
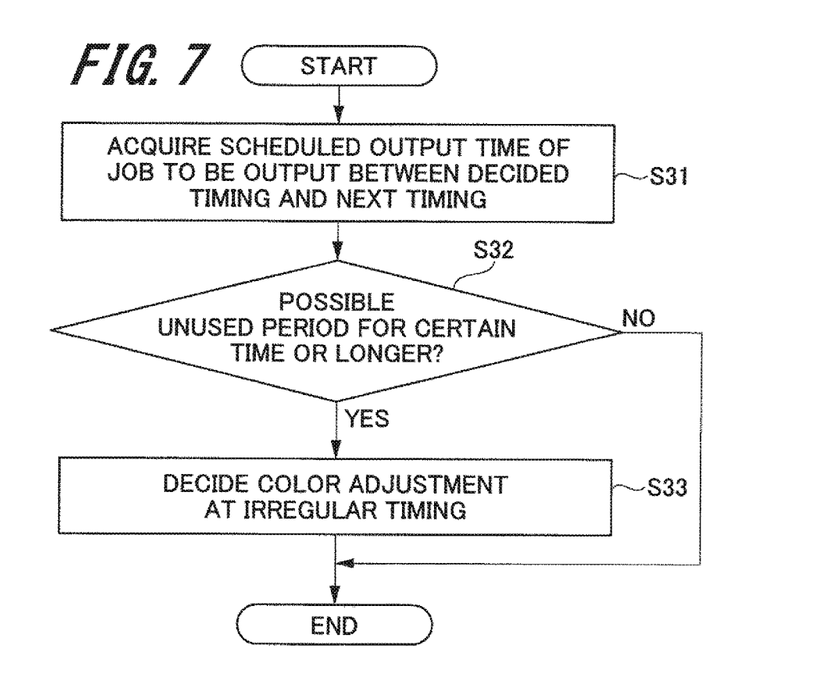
FIG. 7 is the flowchart illustrating exemplary processing of an Example 2 in which color adjustment timings occur irregularly.

Exemplary processing of the Example 2 in which color adjustment timings are irregularly generated will be described using the flowchart of FIG. 7. Note that the processing which irregularly generates color adjustment timings is executed in the printer C by the automatic color adjustment execution portion 21 as processing at step S18 and the subsequent steps of FIG. 2.

The color adjustment timing decision portion 16 decides the color adjustment timing of changing the color correction target at step S18 of FIG. 2, subsequently decides the next color adjustment timing of changing the color correction target, and acquires the scheduled output time of a job to be output between the two color adjustment timings (step S31).

Subsequently, the color adjustment timing decision portion 16 determines whether or not there occurs an unused period of printer for a certain time or longer, from the scheduled output time of a job to be output between two color adjustment timings (step S32). An unused period of a printer can be obtained on the basis of the color adjustment timing decided at step S31 and the reserved job information. Then, when it is determined that there occurs an unused period for a certain time or longer (YES at S32), the color adjustment timing decision portion 16 decides to perform color adjustment at an irregular timing, i.e., a timing which is not limited to the periodic execution timing of automatic color adjustment (step S33).

Figure 2:
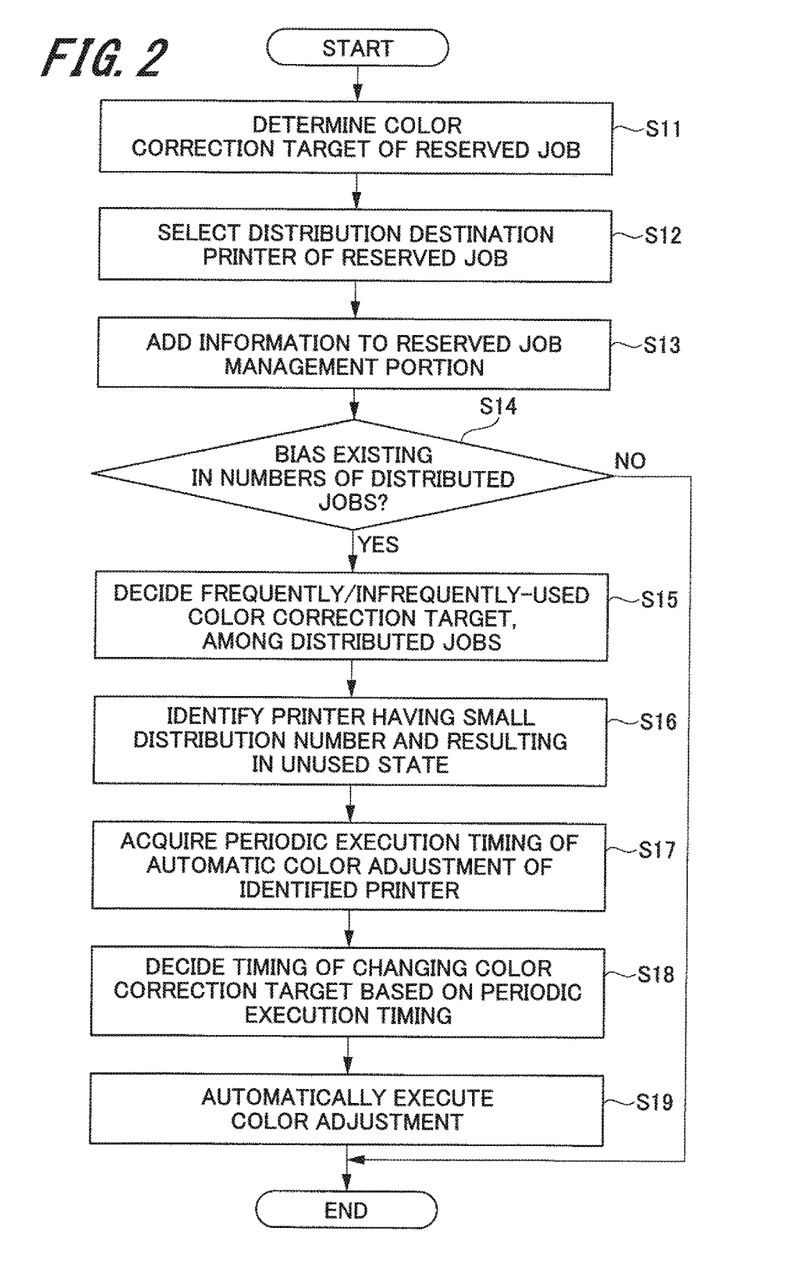
FIG. 2 is a flowchart illustrating an exemplary flow of distributed printing processing performed in the distributed printing system having the information processing apparatus according to the first embodiment.

In the printer C, the automatic color adjustment execution portion 21 repeats the periodic execution of automatic color adjustment at the periodic execution timing, changes the color correction target at an irregular timing which is not limited to the periodic execution timing of automatic color adjustment decided by the color adjustment timing decision portion 16, and executes color adjustment (step S19 of FIG. 2). Note that, when it is determined at step S32 there occurs no unused period for a certain time or longer (NO at Step 32), the processing at step S33 will not be performed.

Figure 8:
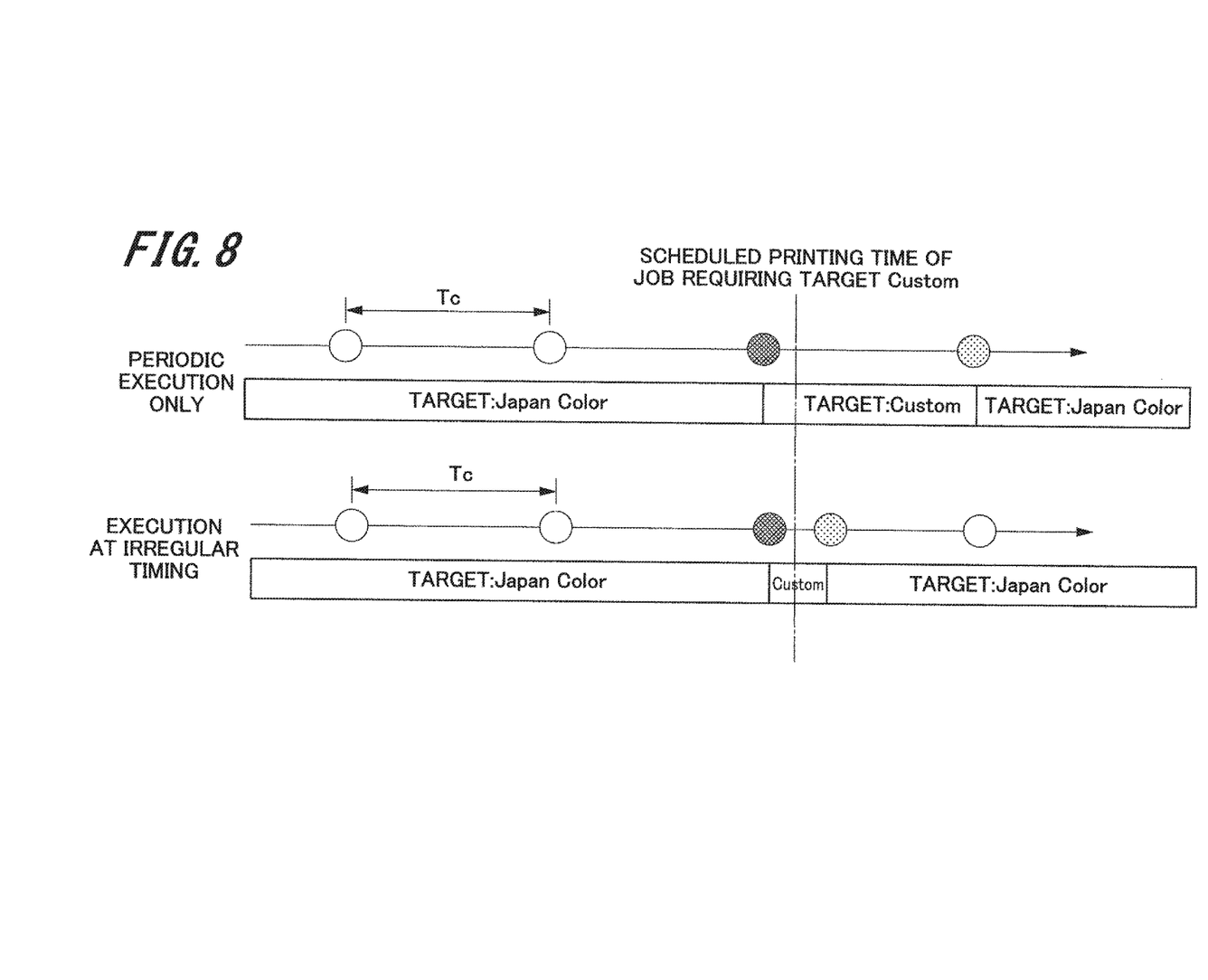
FIG. 8 is a timing chart illustrating a time series image comparing the case of the Example 1 with the case of the Example 2.

A time series image in a case where color adjustment is executed at an irregular timing is illustrated in FIG. 8. FIG. 8 illustrates a comparison between a case of the Example 1 where color adjustment is executed at a periodic execution timing of automatic color adjustment and a case of the Example 2 where color adjustment is executed at an irregular timing which is not limited to the periodic execution timing of automatic color adjustment. In FIG. 8, the upper stage illustrates the Example 1 of periodic execution, and the lower stage illustrates the Example 2 of irregular execution.

In the case of the Example 2, the scheduled output time of a reserved job of the printer C is "2015/4/16 8:00", and thus the previous periodic execution timing of automatic color adjustment is the timing of changing to the color correction target "Custom". Namely, the color correction target is changed to "Custom" at the previous periodic execution timing of automatic color adjustment of the scheduled output time of the reserved job (the timing indicated by a circle hatched with a halftone pattern in the drawing) in the printer C which has been outputting jobs according to the most frequently used color correction target "Japan Color". In addition, the color correction target is returned to "Japan Color" at an irregular timing before the next periodic execution timing of automatic color adjustment (the timing indicated by a circle hatched with a circle dot pattern in the drawing).

According to the Example 2, the timing of applying the color correction target and of performing color adjustment can be irregularly decided, and thus it is not necessary to wait for the next periodic execution timing of automatic color adjustment in order to change the color correction target, as is apparent from the comparison with the Example 1 in which color adjustment is executed at a periodic execution timing of automatic color adjustment. Accordingly, it is possible to eliminate waste of time, and thus possible to contribute to enhancing productivity.

Second Embodiment

The first embodiment described above assumes a case where reserved jobs are accumulated. However, an operation without job reservation is also conceivable depending on the customer. A second embodiment described below is provided in view of the point.

Figure 9:
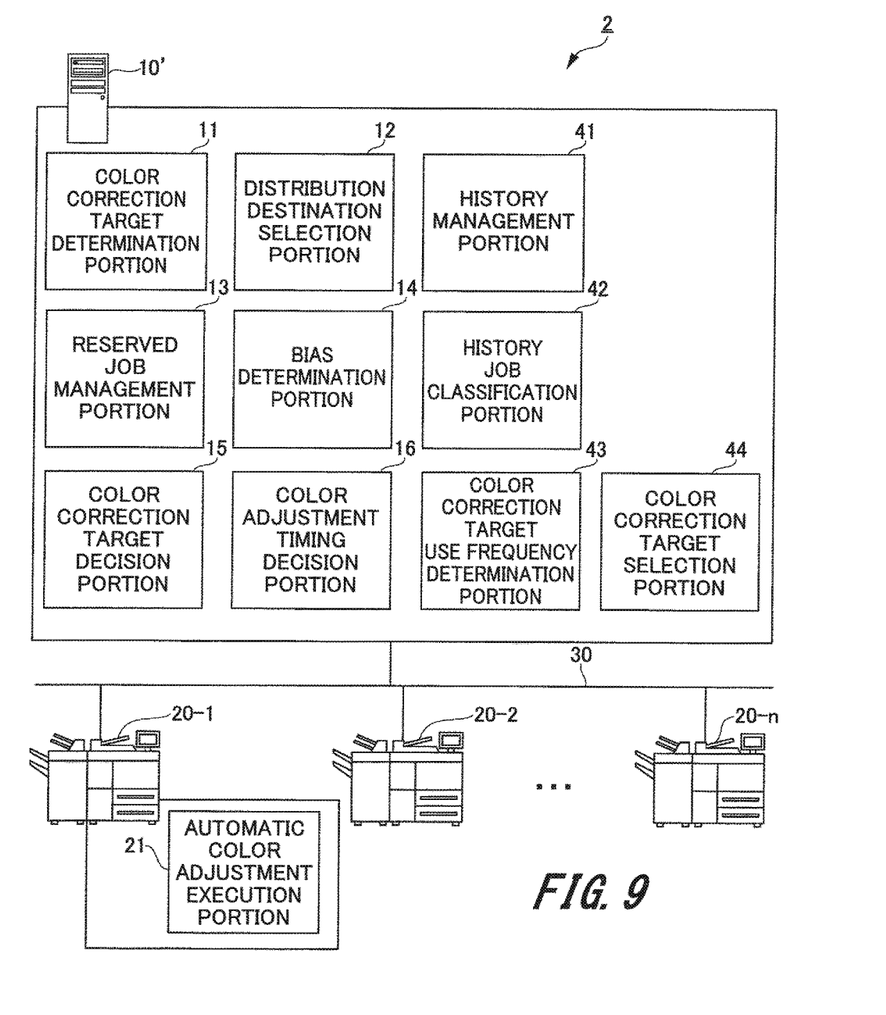
FIG. 9 is a system configuration diagram illustrating an exemplary configuration of a distributed printing system having an information processing apparatus according to a second embodiment of the present invention.

FIG. 9 is a system configuration diagram illustrating an exemplary configuration of a distributed printing system having an information processing apparatus according to the second embodiment of the present invention.

[System Configuration]

As illustrated in FIG. 9, a distributed printing system 2 having an information processing apparatus according to the second embodiment basically has a configuration similar to that of the distributed printing system 1 having the information processing apparatus according to the first embodiment. Namely, the distributed printing system 2 has a job distribution server 10' and the n printers 20_1, 20_2, . . . , 20_n mutually communicably connected via the network 30, and the job distribution server 10' manages, as a group, the n printers 20_1, 20_2, . . . , 20_n. In addition, in the distributed printing system 2, the job distribution server 10' serves as the information processing apparatus according to the second embodiment of the present invention.

(Job Distribution Server)

The job distribution server 10' includes, in addition to the respective functional portions (11 to 16) of the job distribution server 10 of the first embodiment, respective functional portions such as a history management portion 41, a history job classification portion 42, a color correction target use frequency determination portion 43, and a color correction target selection portion 44.

In the job distribution server 10' having the above-described configuration, the history management portion 41 is software that manages, for each printer, the job output history of the past in the case where there is no reserved job in the reserved job management portion 13. Specifically, the history management portion 41 manages, for each printer, for example, the numbers of jobs output for each color correction target or the like. The history job classification portion 42 is software that classifies output jobs for each color correction target, from a history for a certain period being managed by the history management portion 41.

Specifically, the classification is performed for each printer in terms of the number of jobs output according to the color correction target "Japan Color" or the number of jobs output according to the color correction target "GRACoL" (registered trademark) in the, for example, past year.

The color correction target use frequency determination portion 43 is software that determines, for each printer, the use frequency of a color correction target in accordance with the number of jobs classified by the history job classification portion 42. The color correction target selection portion 44 is software that selects, for each printer, a color correction target which is highly likely to be used thereafter, from the result of determination by the color correction target use frequency determination portion 43.

(Printer)

The n printers 20_1, 20_2, . . . , 20_n which output jobs distributed by the job distribution server 10' have a configuration similar to that of the printers 20_1, 20_2, . . . , 20_n of the first embodiment. Namely, the printers 20_1, 20_2, . . . , 20_n include the functional portion of the automatic color adjustment execution portion 21 which periodically and automatically perform color adjustment to a prescribed color correction target. In addition, the automatic color adjustment execution portion 21 includes a colorimeter provided therein, and is hardware and software that automatically perform chart printing, colorimetry, and feedback to thereby perform color adjustment.

[Flow of Distributed Printing]

Figure 10:
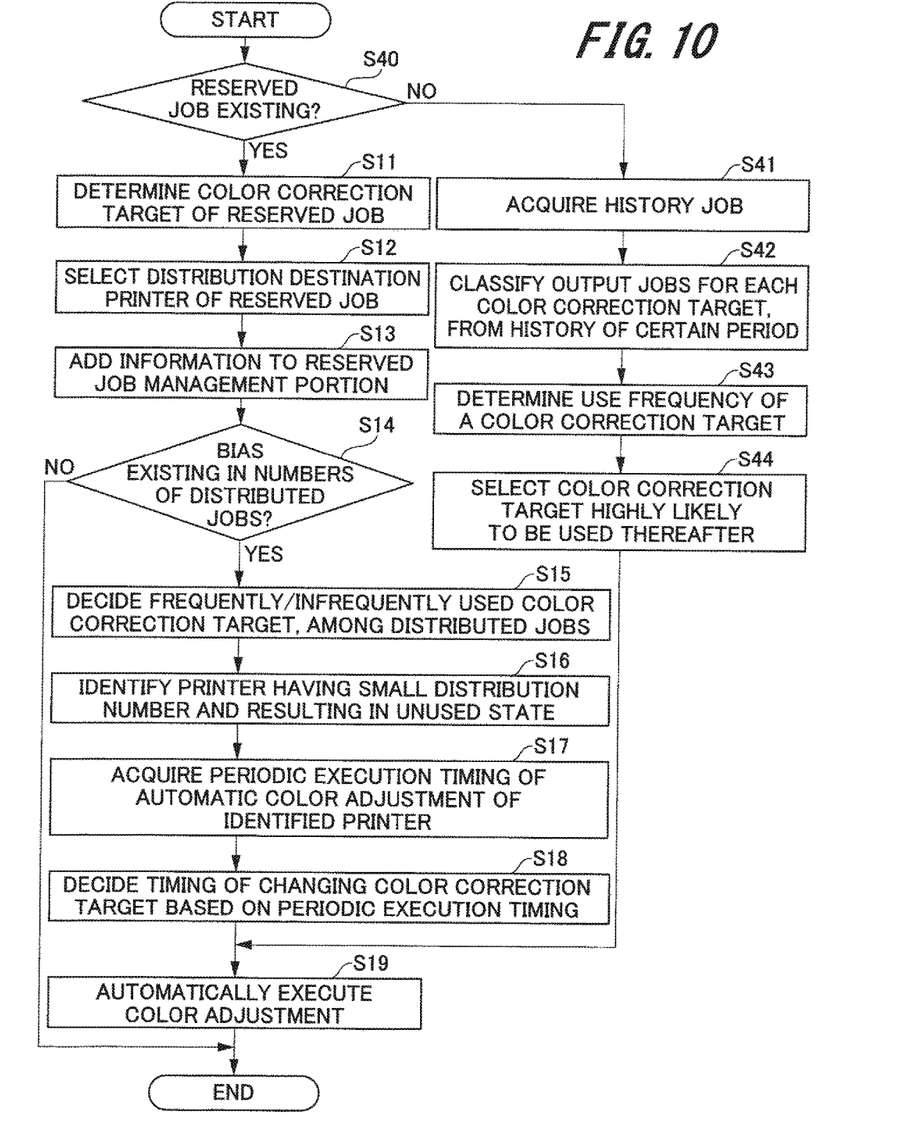
FIG. 10 is a flowchart illustrating an exemplary flow of a distributed printing processing performed in the distributed printing system having the information processing apparatus according to the second embodiment.

Subsequently, in the distributed printing system 2 having the above-described configuration, an exemplary flow of a distributed printing processing executed under control by a computer included by the distributed printing system 2 will be described using the flowchart of FIG. 10. Hereinafter, three printers A, B and C will be described for the n printers 20_1, 20_2, . . . , 20_n, as with the case of the first embodiment.

The computer included by the distributed printing system 2 first determines whether or not there exists a reserved job in the reserved job management portion 13 (step S40), and executes the processing of steps S11 to S19 in a case where there exists a reserved job (YES at S40). The processing of steps S11 to S19 is the same as the processing of steps S11 to S19 of FIG. 2 in the case of the first embodiment.

In a case where there is no reserved job in the reserved job management portion 13 (NO at S40), the following processing is executed under control by the computer included by distributed printing system 2. Namely, in a case where there is no reserved job, the history management portion 41 acquires a history job from the job output history of the past being managed for each printer (step S41).

Subsequently, the history job classification portion 42 classifies output jobs for each color correction target, from the history of a certain period (e.g., the past year) being managed by the history management portion 41 (step S42). Specifically, the history job classification portion 42 classifies, for each printer, the number of jobs output according to the color correction target "Japan Color" or the number of jobs output according to the color correction target "GRACoL" (registered trademark), for example, over the past one year.

Next, the color correction target use frequency determination portion 43 determines the use frequency of a color correction target for each printer in accordance with the number of jobs classified by the history job classification portion 42 (step S43). Then, the color correction target selection portion 44 predicts, and selects, for each printer, a color correction target which is highly likely to be used thereafter, from the result of determination by the color correction target use frequency determination portion 43 (step S44). Specifically, when, for example, the use frequency of the color correction target "Japan Color" is high in the printer A, the color correction target selection portion 44 selects "Japan Color" as the color correction target which is highly likely to be used in the printer A thereafter.

Subsequently, the selected color correction target is applied to each of the printers A, B and C. Accordingly, color adjustment is automatically performed in each of the printers A, B and C, in accordance with the color correction target predicted to be output thereafter (step S19).

[Information Processing Program]

The above-described various processing in the job distribution server 10' is executed by program instructions issued to the computer included by the job distribution server 10'. The information processing program which causes the computer to perform the various processing in the job distribution server 10' may be preliminarily installed in a memory included by the job distribution server 10'. However, without being limited to the foregoing, the information processing program can also be provided via wired or wireless communication means, or can also be provided by storing a computer-readable recording medium such as an IC card or a USB memory.

As has been described above, the distributed printing system 2 according to the second embodiment performs processing of classifying output jobs for each color correction target from the job output history of the past, of determining the use frequency of a color correction target in accordance with the number of jobs, and of selecting a color correction target which is highly likely to be used thereafter from the determination result. The processing makes it possible to predict a color correction target which is highly likely to be used thereafter on the basis of the job output history of the past and to preliminarily perform color adjustment for each printer according to the color correction target, even in a case where the customer is performing an operation without job reservation, which can lead to enhanced productivity.

Third Embodiment

Figure 11:
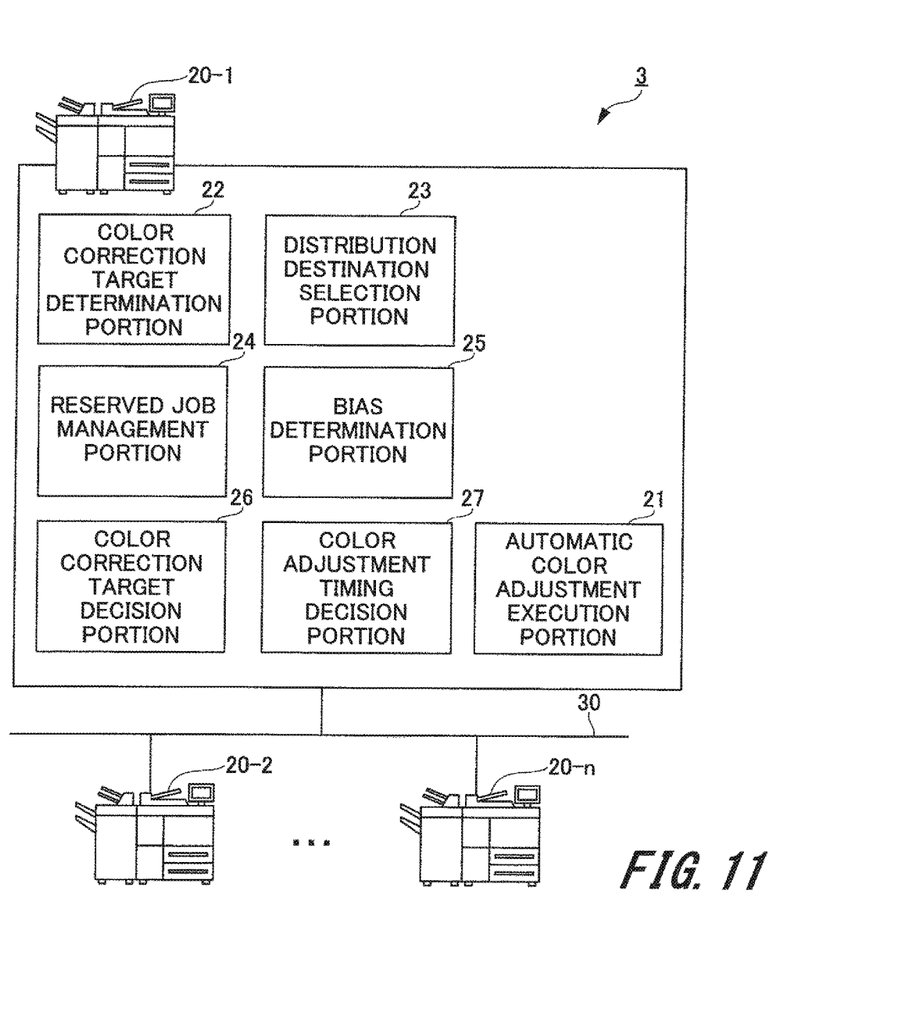
FIG. 11 is a system configuration diagram illustrating an exemplary configuration of a distributed printing system having an information processing apparatus according to a third embodiment of the present invention.

FIG. 11 is a system configuration diagram illustrating an exemplary configuration of a distributed printing system having an information processing apparatus according to a third embodiment of the present invention.

[System Configuration]

As illustrated in FIG. 11, a distributed printing system 3 has n printers 20_1, 20_2, . . . , 20_n mutually communicably connected via the network 30, one printer of which distributes jobs to the other printers. Namely, any one or all of the n printers 20_1, 20_2, . . . , 20_n in the distributed printing system respectively may be the information processing apparatus according to the third embodiment. Here, description will be provided taking as an example a case where the printer 20_1 is the information processing apparatus according to the third embodiment.

(Printer)

The printer 20_1 includes, in addition to the automatic color adjustment execution portion 21, respective functional portions such as a color correction target determination portion 22 for each job, a distribution destination selection portion 23, a reserved job management portion 24, a bias determination portion 25, a color correction target decision portion 26, and a color adjustment timing decision portion 27. The functional portions 22 to 27 respectively correspond to the color correction target determination portion 11, the distribution destination selection portion 12, the reserved job management portion 13, the bias determination portion 14, the color correction target decision portion 15, and the color adjustment timing decision portion 16 in the first embodiment, and have the same functions.

Namely, the color correction target determination portion 22 is software that determines, on the basis of information of an output-reserved job, the color correction target of the job. The distribution destination selection portion 23 is software that decides the output destination of a job (i.e., a printer to which the job is distributed), from the color correction target of other printers being managed via the network 30, i.e., the printers 20_2 and 20_3, and the color correction target of the job determined by the color correction target determination portion 22.

The reserved job management portion 24 is software that manages, as reserved job information, the color correction target determined by the color correction target determination portion 22, and information such as the output destination printer decided by the distribution destination selection portion 23 and the scheduled output time of the job. The bias determination portion 25 is software that determines whether or not there is a bias in the numbers of jobs among the distribution destination printers, from a list of reserved job information accumulated in the reserved job management portion 24.

The color correction target decision portion 26 is software that decides a color correction target to be applied to a printer having a small number of distributed jobs and resulting in an unused state, in a case where the bias determination portion 25 has determined that there is a bias in the numbers of the distributed jobs (numbers of jobs). The color adjustment timing decision portion 27 is software that decides the timing of changing the color correction target and of performing color adjustment on the printer resulting in an unused state, on the basis of a periodic execution timing of automatic color adjustment periodically performed by the printer having a small number of jobs and resulting in an unused state, and the scheduled output time of the job.

The processing performed by the distributed printing system 3 according to the third embodiment described above is summarized as follows. Namely, the bias determination portion 25 determines whether or not there is a bias in job distribution among the printers A, B, and C, and in a case where the bias determination portion 25 has determined that there is a bias in job distribution, the color correction target decision portion 26 decides a color correction target to be applied to the printer having a small number of distributed jobs and resulting in an unused state. In addition, the color adjustment timing decision portion 27 then decides the timing of applying the decided color correction target and of performing color adjustment, and the automatic color adjustment execution portion 21 performs, at the decided timing, color adjustment on the printer resulting in an unused state.

Accordingly, a part of the jobs which have been scheduled to be output to a printer having a large number of jobs becomes possible to be output, in a distributed manner, to a printer having a small number of distributed jobs and resulting in an unused state. As described above, by dynamically changing the color correction target for each printer, it is possible to effectively utilize the time during which a printer is unused depending on the job status because color correction targets are conventionally fixed to respective printers, and thus enhancement of productivity can be achieved.

Note that the color correction target decision portion 26 can also be constituted to have the following function. Namely, the color correction target decision portion 26 identifies a color correction target having a bias in the numbers of jobs and a printer having a small number of distributed jobs, and determines whether or not the color correction target is an outputable color gamut of the identified printer. In addition, in a case where the color correction target is not an outputable color gamut, the determination is repeated for a printer having the next small number of distributed jobs, or in a case where the color correction target is an outputable color gamut, the color correction target of printer having the next small number is decided to the color correction target to be applied to a printer having a small number of distributed jobs.

Although a case where the printer 20_1 is assumed to be the information processing apparatus according to the third embodiment has been described above, each of other printers 20_2, . . . , 20_n can also be constituted to include a similar functional portion, or all of the printers 20_1, 20_2, . . . , 20_n can each also be constituted to include a similar functional portion.

In addition, in a case where there are no printers coinciding with each other in terms of a color correction target, among the printers 20_1, 20_2, . . . , 20_n associating with each other via the network 30, there can also be adopted a configuration including a second reserved job management portion that holds jobs as its own reserved jobs. In such a case, jobs accumulated in the second reserved job management portion are preferentially distributed, when the bias determination portion 25 has determined that there is a bias in the jobs.

[Information Processing Program]

The above-described various processing in the printer is executed by program instructions issued to the computer included by the printer. The information processing program which causes the computer to perform the various processing in the printer may be preliminarily installed in a memory included by the printer. However, without being limited to the foregoing, the information processing program can also be provided via wired or wireless communication means, or can be stored on, and can also be provided by storing a computer-readable recording medium such as an IC card or a USB memory.

<Modification>

In the above-described respective embodiments, although a printer has been taken as an example of the image forming apparatus being the job distribution destination, the embodiments are not limited to the application example, and a copier, a facsimile, a printing machine, a hybrid machine, and the like, in addition to a printer, may be used.

Furthermore, although, in the above embodiment, each of the functional portions of the job distribution servers 10 and 10' or the printers 20_1, 20_2, . . . , 20_n is assumed to be realized by software by a computer interpreting and executing a program that realizes each of the functions, the present invention is not limited to this. A part or all of respective functional portions of the job distribution servers 10 and 10' or the printers 20_1, 20_2, . . . , 20_n can also be realized using hardware through design or the like of a part or the whole thereof by using, for example, an integrated circuit.

What is claimed is:

1. An information processing apparatus comprising:
a hardware processor configured to:
  determine whether or not there is a bias in numbers of output-reserved jobs to be distributed to a plurality of image forming apparatuses;
  decide a color correction target to be applied to an image forming apparatus having a small number of jobs, in a case where the hardware processor has determined that there is a bias in numbers of jobs; and
  apply the color correction target decided by the hardware processor to the image forming apparatus having a small number of jobs, to thereby decide a timing of performing color adjustment on the image forming apparatus having a small number of jobs.

2. The information processing apparatus according to claim 1, wherein
the hardware processor is further configured to automatically perform color adjustment at a periodic timing, and
the hardware processor applies a color correction target to an image forming apparatus having a small number of jobs to thereby decide the timing of performing color adjustment on the basis of reserved job information, a scheduled output time of a reserved job, and a periodic color adjustment timing by the hardware processor.

3. The information processing apparatus according to claim 2, wherein
the hardware processor decides the timing of applying the color correction target to the image forming apparatus having a small number of jobs and of performing color adjustment, from among the periodic color adjustment timing.

4. The information processing apparatus according to claim 2, wherein
the hardware processor decides the timing of applying the color correction target to the image forming apparatus having a small number of jobs and of performing color adjustment, at a timing other than the periodic color adjustment timing, in a case where an unused period of an image forming apparatus obtained from the decided color adjustment timing and the reserved job information reaches a predetermined time or longer.

5. The information processing apparatus according to claim 1, further comprising:
the hardware processor is further configured to:
manage job output history of the past in a case where there is no output-reserved job;
classify output jobs for each color correction target, from a history for a certain period being managed by the hardware processor;
determine a use frequency of a color correction target, in accordance with the small number of jobs classified by the hardware processor, and
select a color correction target that is highly likely to be used thereafter, from determination by the hardware processor.

6. The information processing apparatus according to claim 1, which preliminarily configures the plurality of image forming apparatuses as a group of image forming apparatuses to be managed, and distributes jobs to the plurality of image forming apparatuses.

7. A nontransitory computer-readable recording medium storing an information processing program that causes a computer to execute processing steps comprising:
bias determination processing of determining, by an information processing apparatus that distributes output-reserved jobs to the plurality of image forming apparatuses, whether or not there is a bias in numbers of jobs to be distributed to the plurality of image forming apparatuses;
color correction target decision processing of deciding, by the information processing apparatus, a color correction target to be applied to an image forming apparatus having a small number of jobs, in a case where the information processing apparatus has determined in the bias determination processing that there is a bias in numbers of jobs; and color adjustment timing decision processing of applying, by the information processing apparatus, the color correction target decided in the color correction target determination processing to the image forming apparatus having a small number of jobs, to thereby decide a timing of performing color adjustment on the image forming apparatus having a small number of jobs.

8. The nontransitory recording medium according to claim 7, wherein the information processing apparatus preliminarily configures the plurality of image forming apparatuses as a group of image forming apparatuses to thereby be managed, and distributes jobs to the plurality of image forming apparatuses.

\* \* \* \* \*